United States Patent
Ikenaga et al.

(10) Patent No.: US 9,896,275 B2
(45) Date of Patent: Feb. 20, 2018

(54) ARTICLE TRANSPORT FACILITY

(71) Applicant: Daifuku Co., Ltd., Osaka-shi (JP)

(72) Inventors: Kensuke Ikenaga, Hinocho (JP); Tsubasa Yajima, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/247,111

(22) Filed: Aug. 25, 2016

(65) Prior Publication Data

US 2017/0057750 A1    Mar. 2, 2017

(30) Foreign Application Priority Data

Aug. 27, 2015 (JP) .................................. 2015-168161

(51) Int. Cl.
*B65G 17/20* (2006.01)
*B65G 43/00* (2006.01)

(52) U.S. Cl.
CPC ...... *B65G 43/00* (2013.01); *B65G 2201/0297* (2013.01); *B65G 2203/02* (2013.01); *B65G 2203/042* (2013.01)

(58) Field of Classification Search
CPC ........... B61B 13/00; B61B 13/04; B61K 9/08; B61K 9/10; E01B 25/24; B65G 17/20; B65G 19/025

USPC .... 198/678.1, 465.4; 104/89, 91, 93, 94, 95; 701/31.4, 19

See application file for complete search history.

(56) References Cited

U.S. PATENT DOCUMENTS

| | | | |
|---|---|---|---|
| 8,190,377 B2 * | 5/2012 | Fu | G01K 13/06 104/93 |
| 2012/0132005 A1 * | 5/2012 | Turner | B61K 9/10 73/597 |
| 2013/0047729 A1 * | 2/2013 | Wigh | G01N 29/043 73/636 |
| 2014/0207317 A1 * | 7/2014 | Noffsinger | B61K 9/10 701/19 |
| 2015/0179003 A1 * | 6/2015 | Cooper | B60L 3/10 701/31.4 |
| 2017/0038316 A1 * | 2/2017 | Belcher | B61K 9/10 |

FOREIGN PATENT DOCUMENTS

JP          2006290177 A    10/2006

* cited by examiner

*Primary Examiner* — James R Bidwell
(74) *Attorney, Agent, or Firm* — The Webb Law Firm

(57) ABSTRACT

An article transport facility comprises a travel rail installed along a travel path, and a travel vehicle which is guided along the travel path with a travel wheel rolling on a travel surface of the travel rail. The travel vehicle has a distance measuring device for measuring a distance to the travel surface. And the distance measuring device includes a pair of distance sensors spaced apart from each other along a travel direction of the travel vehicle.

8 Claims, 6 Drawing Sheets

ARTICLE TRANSPORT FACILITY

CROSS-REFERENCE TO RELATED APPLICATION

This application claims priority to Japanese Patent Application No. 2015-168161 filed Aug. 27, 2015, the disclosures of which is hereby incorporated in its entirety by reference.

FIELD OF THE INVENTION

The present invention relates to an article transport facility comprising a travel rail installed along a travel path, a travel vehicle which is guided along the travel path with a travel wheel rolling on a travel surface of the travel rail, wherein the travel vehicle has a distance measuring device for measuring a distance to the travel surface.

BACKGROUND

An example of article transport facilities such as one described above is disclosed in JP Publication of Application No. 2006-290177 (Patent Document 1). The article transport facility of Patent Document 1 includes a travel rail installed along a travel path, and a travel vehicle which is guided along the travel path with travel wheels rolling on travel surfaces of the travel rail. A step may form in the travel surface of the travel rail, in a form of a discontinuity in the travel rail or in a form of a damage, etc., at a joint of the travel rail. And when the travel vehicle travels over such a step, it has an adverse effect of causing vibration of the travel vehicle and of promoting wear of the travel wheels of the travel vehicle.

Thus, in the article transport facility disclosed in Patent Document 1 described above, the travel vehicle has a distance sensor for measuring the distance to a travel surface of the travel rail. And the controller of the article transport facility is configured to manage the distance to the travel surfaces of the travel rail based on the result of the measurement by the distance sensor.

SUMMARY OF THE INVENTION

When a travel vehicle travels along a travel rail, the travel vehicle may vibrate when a travel wheel travels over a joint of the travel rail, or over a small particle on the travel rail. And the travel vehicle may vibrate because of the vibration of a travel actuator. Such vibration is transmitted to the distance measuring device provided to the travel vehicle.

In the article transport facility disclosed in Patent Document 1 described above, the travel vehicle has a single distance sensor to measure the distance between the distance sensor itself and a travel surface of the travel rail. When the vibration is transmitted to the distance sensor as described above, there have been cases where the measured values obtained by the distance sensor do not correlate with the distance to the travel surface of the travel rail. Therefore, where only one distance sensor is provided, there were cases where it is impossible to know the presence of a step in a travel surface of the travel rail based on the measurement results of the distance sensor, for example.

Therefore, an article transport facility is desired in which a distance measuring device is provided to a travel vehicle, and in which it is possible to perform a proper measurement with the distance measuring device even when the travel vehicle vibrates.

The characteristic features of an article transport facility provided in light of the above are that the article transport facility comprises:

a travel rail installed along a travel path, a travel vehicle which is guided along the travel path with a travel wheel rolling on a travel surface of the travel rail;

wherein the travel vehicle has a distance measuring device for measuring a distance to the travel surface;

wherein the distance measuring device includes a pair of distance sensors spaced apart from each other along a travel direction of the travel vehicle.

In the article transport facility having the features described above, the distance measuring device provided to the travel vehicle includes a pair of distance sensors spaced apart from each other along the travel direction of the travel vehicle. The difference (or the absolute value thereof) between the measured values obtained by the pair of distance sensors spaced apart from each other along the travel direction is a value that does not include the effect of any vibrations that may occur with the traveling of the travel vehicle. And when the pair of distance sensors measure a location in which no step is formed in the travel surface of the travel rail, the difference is zero, whereas when the pair of distance sensors measure a location in which a step is formed, the difference takes on a value greater than zero. As a result, a step which may be formed in the travel surface, for example, can be properly detected without being affected by any vibrations that may occur with the traveling of the travel vehicle.

DETAILED DESCRIPTION

Figure 1:
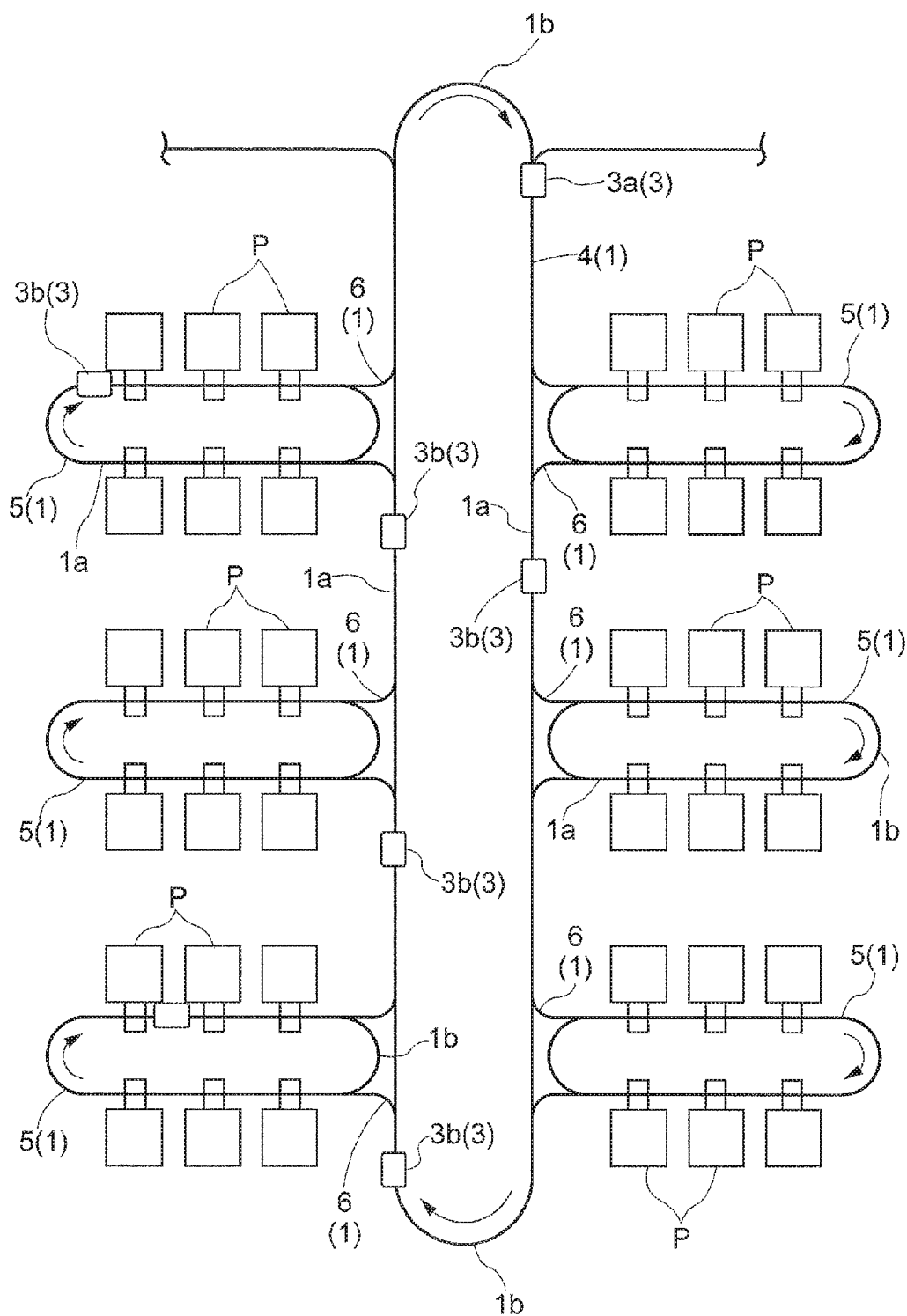
FIG. 1 is a plan view of a principal portion of an article transport facility.

The article transport facility in accordance with an embodiment is described next with reference to the attached drawings.

As shown in FIGS. 1-5, the article transport facility includes travel rails 2 provided along travel paths 1, and travel vehicles 3 each of which is guided along travel paths 1 with its travel wheels 15 rolling on travel surfaces of the travel rails 2. A single inspection vehicle 3a among the travel vehicles 3 has distance sensors S7 (distance measuring device) for measuring the distance to the travel surfaces. In the present embodiment, the inspection vehicle 3a is, or corresponds to, the "travel vehicle". Each distance sensor S7 measures the distance between the distance sensor S7 and the corresponding travel surface. The article transport facility has, as travel vehicles 3, a plurality of article transport vehicles 3b for transporting FOUPs (Front Opening Unified Pod) for holding one or more semiconductor substrates, with each FOUP being an article to be transported. In the present embodiment, the inspection vehicle 3a and the article transport vehicles 3b, as the travel vehicles 3 are provided in a form of ceiling or overhead travel vehicles which are configured to travel along the travel rails 2 suspended from and supported by the ceiling.

Note that each article transport vehicle 3b has the same structure as the inspection vehicle 3a described below, except for its vertically moving mechanism, laterally moving mechanism, and chuck unit provided thereto. Detailed descriptions of the structures of the vertically moving mechanism, the laterally moving mechanism, and the chuck unit are omitted here since they are well-known.

As shown in FIG. 1, the travel paths 1 include one loop-shaped primary path 4, loop-shaped secondary paths 5 each of which extends by way of a plurality of article processors P, and connecting paths 6 each of which connects the primary paths 4 with a secondary path 5. The travel paths 1 includes a plurality of secondary paths 5. Each of the primary path 4 and the plurality of secondary paths 5 is a path along which each of the travel vehicle 3 traveling along the path travels in the same direction (clockwise in FIG. 1). Note that FIG. 1 shows arrows to indicate the travel directions of the travel vehicles 3.

Each travel path 1 may include one or more straight portions 1a each of which extends straight and one or more curved portions 1b each of which is curved. More specifically, the primary path 4 is formed with a pair of parallel straight portions 1a, and a pair of curved portions 1b each of which connects end portions of the straight portions 1a to each other. Each of the plurality of secondary paths 5 is formed similarly to the primary path 4, and is formed with a pair of straight portions 1a and a pair of curved portions 1b. Each connecting path 6 is formed with a curved portion 1b connected to the primary path 4, and a straight portion 1a connected to a secondary path 5. Thus, each travel path 1 is formed by combining one or more straight portions 1a and one or more curved portions 1b.

In addition, provided as connecting paths 6 are branching connecting paths 6 each of which allows a "branching travel" of a travel vehicle 3 from the primary path 4 toward a secondary path 5, and merging connecting paths 6 each of which allows a "merging travel" of a travel vehicle 3 from a secondary path 5 toward the primary path 4.

The inspection vehicle 3a is described next with reference to FIGS. 2-7.

In the following description, the direction perpendicular to the fore and aft direction of the inspection vehicle 3a in plan view will be referred to as the vehicle body lateral direction. And the direction perpendicular to both the fore and aft direction and the vehicle body lateral direction will be referred to as the vehicle body vertical direction. In addition, in the description, the right direction and the left direction along the vehicle body lateral direction are defined as seen from the back of the inspection vehicle 3a toward the front. In addition, the travel direction of each travel portion 9 is defined to be the direction perpendicular to the direction along which the axis of rotation of the travel wheels 15 extends in plan view. When the inspection vehicle 3a is traveling along a straight portion 1a of the travel paths 1, the fore and aft direction of the inspection vehicle 3a coincides with the travel direction of the travel portion 9.

In addition, for each travel path 1, a direction along which the travel path 1 extends will be referred to as the path longitudinal direction, and the direction perpendicular to the path longitudinal direction in plan view will be referred to as the path width direction, in the following description. Incidentally, for example, when the inspection vehicle 3a is traveling along a straight portion 1a of the travel path 1, the travel direction and the path longitudinal direction coincide with each other, and the vehicle body lateral direction and the path width direction coincide with each other.

The inspection vehicle 3a includes travel portions 9 which are configured to travel on and along a pair of right and left travel rails 2 suspended from and supported by the ceiling, an inspection vehicle main body 10 which is located below the travel rails 2 and is suspended from and supported by the travel portion 9, and power-receiving portions 12 for receiving driving electricity from electricity supply lines 11 provided along travel paths 1 without contacting the supply lines 11.

The travel portions 9 include a first travel portion 9f, and a second travel portion 9r disposed next to the first travel portion 9f along the fore and aft direction. Note that, of the pair of travel portions 9 that are next to each other along the fore and aft direction, the travel portion 9 located on the front side, along the fore and aft direction, will be referred to as the first travel portion 9f whereas the travel portion 9 located on the back side, along the fore and aft direction, will be referred to as the second travel portion 9r.

Provided to the first travel portion 9f are a pair of right and left travel wheels 15 driven and rotated by an electric-powered actuating motor 14, such that these travel wheels 15 travel on respective travel surfaces formed by respective top surfaces of the pair of right and left travel rails 2. Also provided to the first travel portion 9f are pairs of right and left guide wheels 16, with each guide wheel 16 being rotatable about an axis extending along a vehicle body vertical direction (i.e. about a vertical axis), such that the guide wheels 16 are in contact with respective inward surfaces of the pair of right and left travel rails 2. Note that two pairs of right and left guide wheels 16 are provided to the first travel portion 9f such that one pair is spaced apart from the other pair along the fore and aft direction of the vehicle body.

Similarly to the first travel portion 9f, the second travel portion 9r has a pair of right and left travel wheels 15 and two pairs of right and left guide wheels 16.

Note that first travel wheels 15f provided to the first travel portion 9f as its travel wheels 15 and second travel wheels 15r provided to the second travel portion 9r as its travel wheels 15 roll on the travel surfaces of the travel rails 2.

Each of the first travel portion 9f and the second travel portion 9r is provided with a connecting shaft 17 such that it projects below from the lower end of the corresponding travel wheel 15. The inspection vehicle main body 10 has a first support mechanism 18f, and a second support mechanism 18r.

Figure 2:
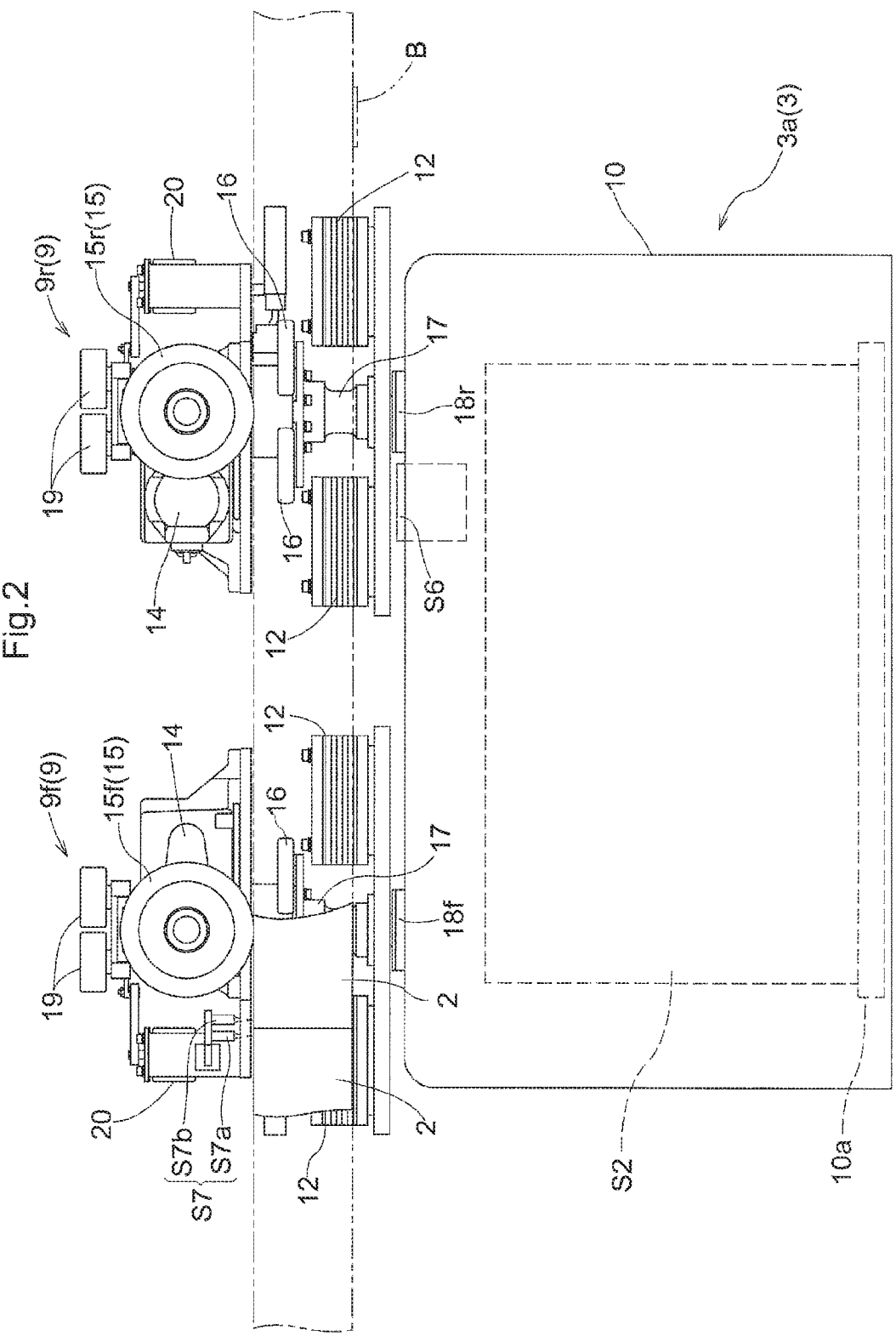
FIG. 2 is a side view of an inspection vehicle.

As shown in FIG. 2, the connecting shaft 17 of the first travel portion 9f and the first support mechanism 18f of the inspection vehicle main body 10 are connected to each other for relative rotation about a first axis extending along the vertical direction. Thus, as a result of the fact that the first travel portion 9f and the inspection vehicle main body 10 are connected to each other in this manner, the inspection vehicle main body 10 is supported by the first travel portion 9f through the first support mechanism 18f. In addition, the first support mechanism 18f is supported by the first travel portion 9f for rotation about the first axis extending along the vertical direction.

The connecting shaft 17 of the second travel portion 9r and the second support mechanism 18r of the inspection vehicle main body 10 are connected to each other for relative rotation about a second axis extending along the vertical direction. Thus, as a result of the fact that the second travel portion 9r and the inspection vehicle main body 10 are connected to each other in this manner, the inspection vehicle main body 10 is supported by the second travel portion 9r through the second support mechanism 18r. In addition, the second support mechanism 18r is supported by the second travel portion 9r for rotation about the second axis extending along the vertical direction.

Here, the first axis is located within the length of the first travel portion 9f along the travel direction and is located within the width along the vehicle body lateral direction, so that the first axis overlaps with the first travel portion 9f, in plan view.

The second axis is located within the length of the second travel portion 9r along the travel direction and is located within the width along the vehicle body lateral direction, so that the second axis overlaps with the second travel portion 9r, in plan view.

Each of the first travel portion 9f and the second travel portion 9r travels along each travel path 1 with its attitude maintained along the travel path 1 as a result of the fact that two sets of guide wheels 16 provided to each are in contact with, and guided by, the pair of travel rail 2. More specifically, each of the first travel portion 9f and the second travel portion 9r travels in such an attitude that, when traveling along a straight portion 1a of the travel path 1, its travel direction is along the path longitudinal direction of the straight portion 1a, and such that, when traveling along a curved portion 1b of the travel path 1, its travel direction is along the tangent direction of the curved portion 1b.

Figure 3:
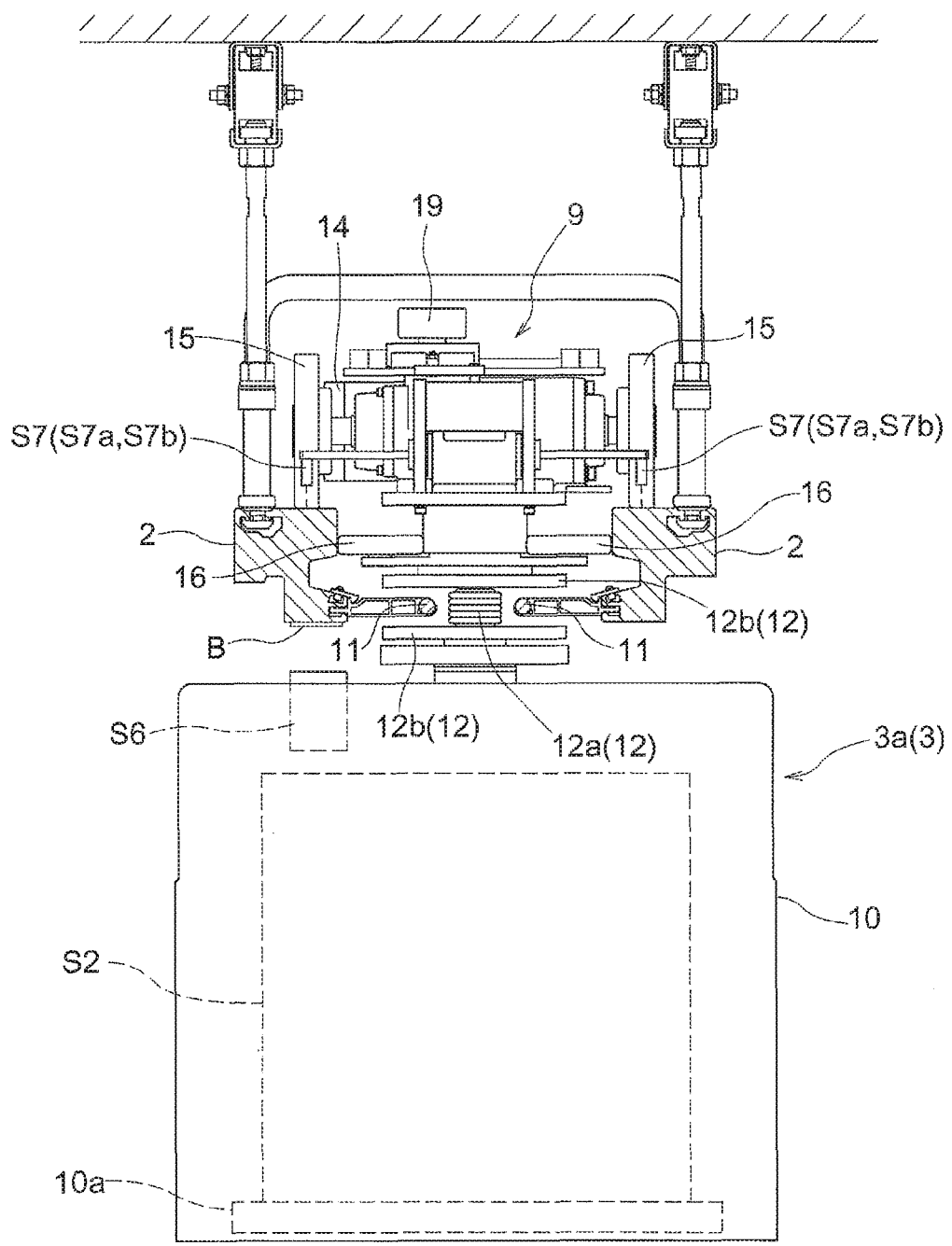
FIG. 3 is a front view of the inspection vehicle.
Figure 4:
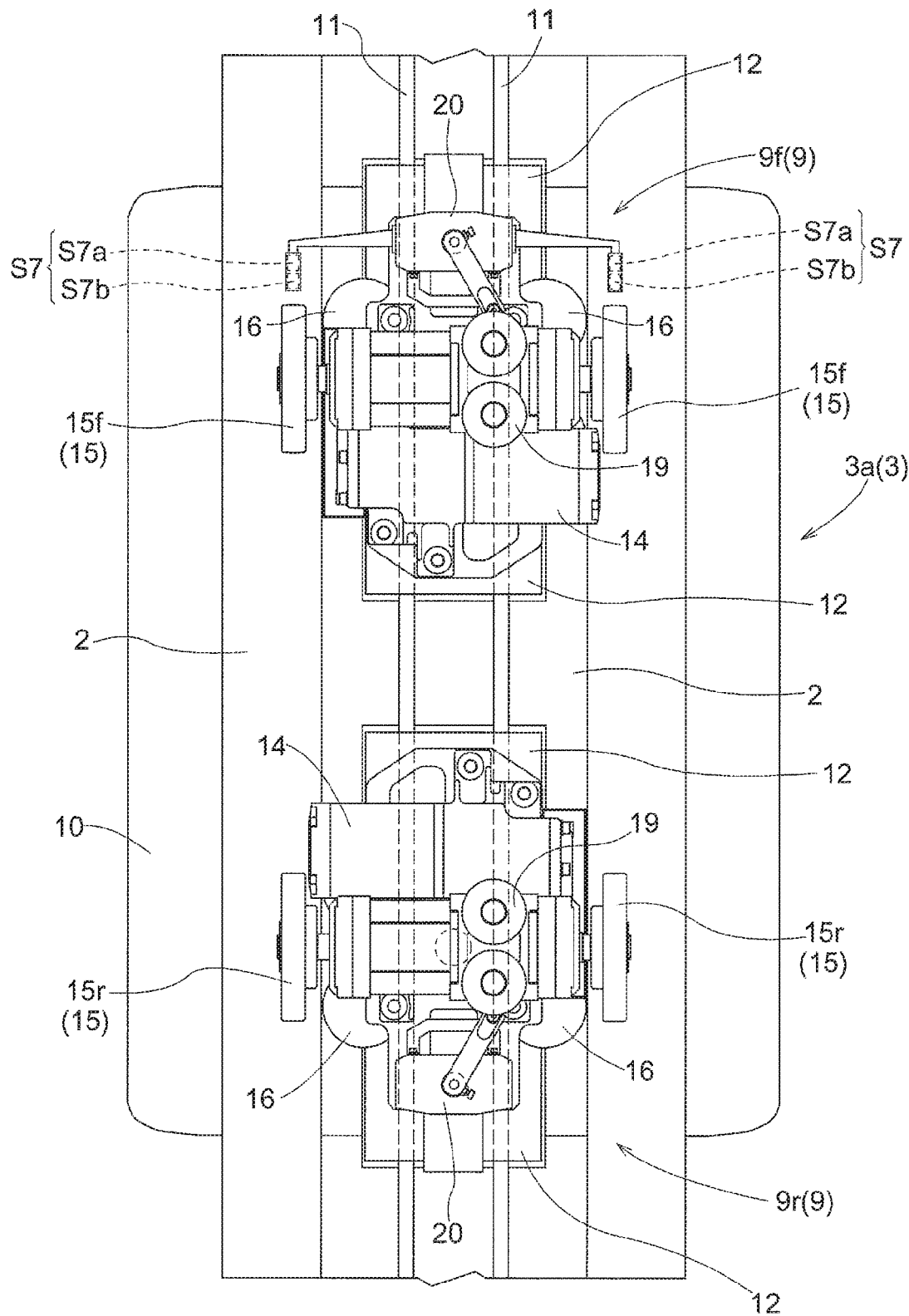
FIG. 4 is a plan view of the inspection vehicle.

As shown in FIGS. 3 and 4, one pair of electricity supply lines 11 are provided such that an electricity supply line is located on each side, along the path width direction, of the power-receiving portions 12, in plan view.

As shown in FIG. 3, each power-receiving portion 12 includes a first portion 12a located between the pair of electricity supply lines 11 and at the same height as the pair of electricity supply lines 11, and second portions 12b, each of which extends to both sides, along the vehicle body lateral direction, from the first portion 12a, with one second portion 12b located above, and the other located below, the pair of electricity supply lines 11.

The second portions 12b includes an upper second portion 12b which extends to both sides, along the vehicle body lateral direction, from the upper end of the first portion 12a, and a lower second portion 12b which extends to both sides, along the vehicle body lateral direction, from the lower end of the first portion 12a.

Figure 5:
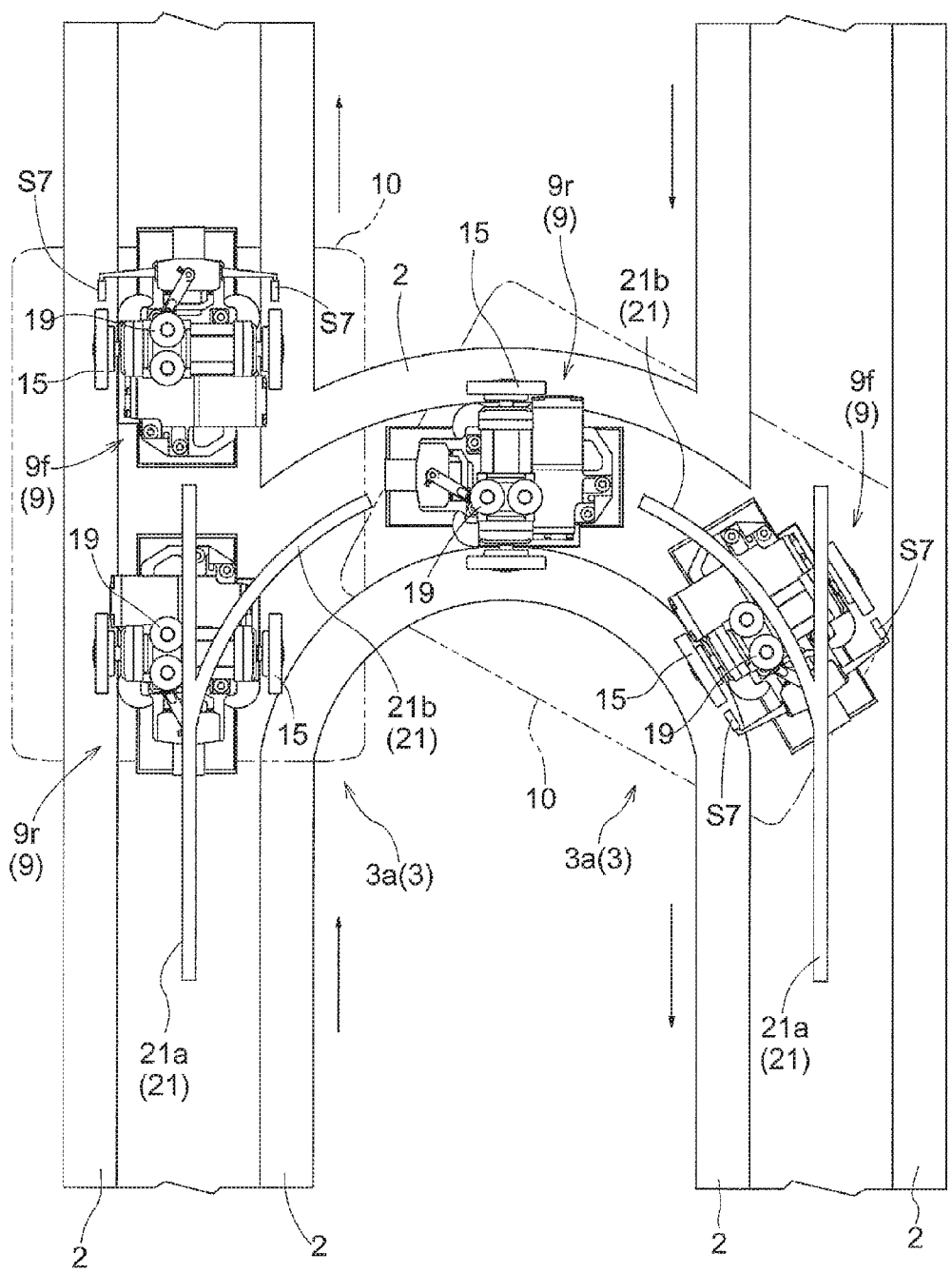
FIG. 5 is a plan view showing the inspection vehicle traveling through a straight portion or a curved portion of travel rails.

As shown in FIGS. 3, 4, and 5, the first travel portion 9f is equipped with a pair of front and back guide auxiliary wheels 19 which are located at a higher position than the travel wheels 15 and which are rotatable about respective vertical axes (axes each extending along the vehicle body vertical direction), and an actuator 20 for moving the pair of front and back guide auxiliary wheels 19 integrally along the vehicle body lateral direction. Note that the second travel portion 9r is equipped with the pair of front and back guide auxiliary wheels 19 and the actuator 20, similarly to the first travel portion 9f.

Guide rails 21 for guiding the guide auxiliary wheels 19 are provided in each connection portion of a travel path 1 where a path branches off from the travel path 1 or merges into the travel path 1 (i.e., a portion in which the primary path 4 and a connecting path 6 are connected to each other, and a portion in which a secondary path 5 and a connecting path 6 are connected to each other). The guide rails 21 are located at a higher position than the pair of right and left travel rails 2, and between the pair of right and left travel rails 2 in plan view.

And the first travel portion 9f is configured such that, as a result of the movement of the pair of front and back guide auxiliary wheels 19 along the vehicle body lateral direction caused by the actuator 20, the position of the pair of front and back guide auxiliary wheels 19 can be moved or changed to a right guiding position in which the pair of front and back guide auxiliary wheels 19 are located to the right side of the center, along the vehicle body lateral direction, of the first travel portion 9f to contact a guide rail 21 from the right, and to a left guiding position in which the pair of front and back guide auxiliary wheels 19 are located to the left side of the center, along the vehicle body lateral direction, of the first travel portion 9f to contact a guide rail 21 from the left.

The second travel portion 9r is also configured such that the position of the pair of front and back guide auxiliary wheels 19 may be moved or changed to the right guiding position and to the left guiding position by the actuator 20, similarly to the first travel portion 9f.

Travel of the inspection vehicle 3a is described next with reference to FIGS. 1 and 5.

As shown in FIG. 5, in a connection portion of a travel path 1, a linear guide rail 21a installed along the straight portion 1a (shown in FIG. 1) of the travel path 1, and a curved guide rail 21b installed along the curved portion 1b (shown in FIG. 1) of the travel path 1 are provided as the guide rails 21.

As shown in FIG. 5, when the inspection vehicle 3a traveling along a secondary path 5 (shown in FIG. 1) enters a connection portion in which a path branches off, the inspection vehicle 3a may travel with the guide auxiliary wheels 19 located to the left side of the linear guide rail 21a by entering the connection portion with the two pairs of front and back guide auxiliary wheels 19 (simply referred to, hereinafter, as the guide auxiliary wheels 19) moved to the left guiding position. This causes the inspection vehicle 3a to perform a branching travel from the straight portion 1a (shown in FIG. 1) of the secondary path 5 (shown in FIG. 1) into the straight portion 1a (shown in FIG. 1) of the connecting path 6, without the guide auxiliary wheels 19 ever guided by the curved guide rail 21b.

In addition, when the inspection vehicle 3a traveling along a secondary path 5 (shown in FIG. 1) enters the connection portion in which the path branches off, the inspection vehicle 3a may travel with the guide auxiliary wheels 19 located to the right side of the linear guide rail 21a by entering the connection portion with the guide auxiliary wheels 19 moved to the right guiding position. This causes the guide auxiliary wheels 19 to be guided by the curved guide rail 21b and causes the inspection vehicle 3a to travel along the secondary path 5 from the straight portion 1a to the curved portion 1b (shown in FIG. 1).

That is, when the guide auxiliary wheels 19 are guided by the curved guide rail 21b, and the inspection vehicle 3a travels along the curved portion 1b of the travel path 1, the inspection vehicle 3a travels with its attitude, as seen along the travel direction, in a tilted attitude in which the inspection vehicle 3a is tilted inward of the curved portion 1b (direction opposite from the direction of the centrifugal force acting on the inspection vehicle 3a) by the guide auxiliary wheels 19.

Figure 7:
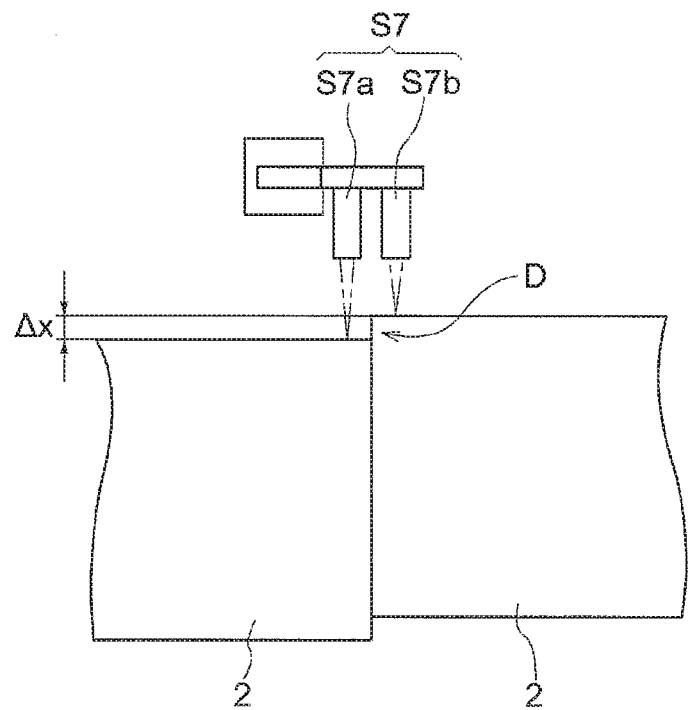
FIG. 7 is a side view showing how a pair of distance sensors are installed with respect to the travel surface of a travel rail.

In the travel surfaces of the travel rails 2 of the article transport facility described so far, a step D may form in a form of a discontinuous portion where there is a discontinuity in the travel surface or in a form of a damage, for example, at a joint of a travel rail, as shown in FIG. 7.

To address this issue, in the article transport facility in accordance with the present embodiment, distance sensors S7 (S7a, S7b) each of which is for measuring the distance to the corresponding travel surface are provided in pairs to the first travel portion 9f of the inspection vehicle 3a with the distance sensors S7 (S7a, S7b) in each pair spaced apart from each other along the travel direction. In other words, the inspection vehicle 3a has a distance measuring device for measuring the distance to travel surfaces of the travel rails 2. And the distance measuring device includes pairs of distance sensors S7a, S7b with the distance sensors S7a, S7b in each pair spaced apart from each other along the travel direction. In addition, the article transport facility in accordance with the present embodiment, an inspection controller device S2 (an example of an inspection controller) is provided which manages the distance to the travel surfaces of the travel rails 2 based on the difference between the measured values, or measurements, of the distance sensors S7a, S7b. Note that, in the present description, "managing the distance to a travel surface of a travel rail" may refer only to a control in which the absolute values of the measurements obtained by the pair of the distance sensors are stored together with the position information along the travel rails 2, as the distance to the travel surface of the travel rail. In other words, the disclosure of the present description includes any arrangement in which the inspection controller does not perform any control related to a determination of the presence of a step in the travel surface of a travel rail.

Figure 6:
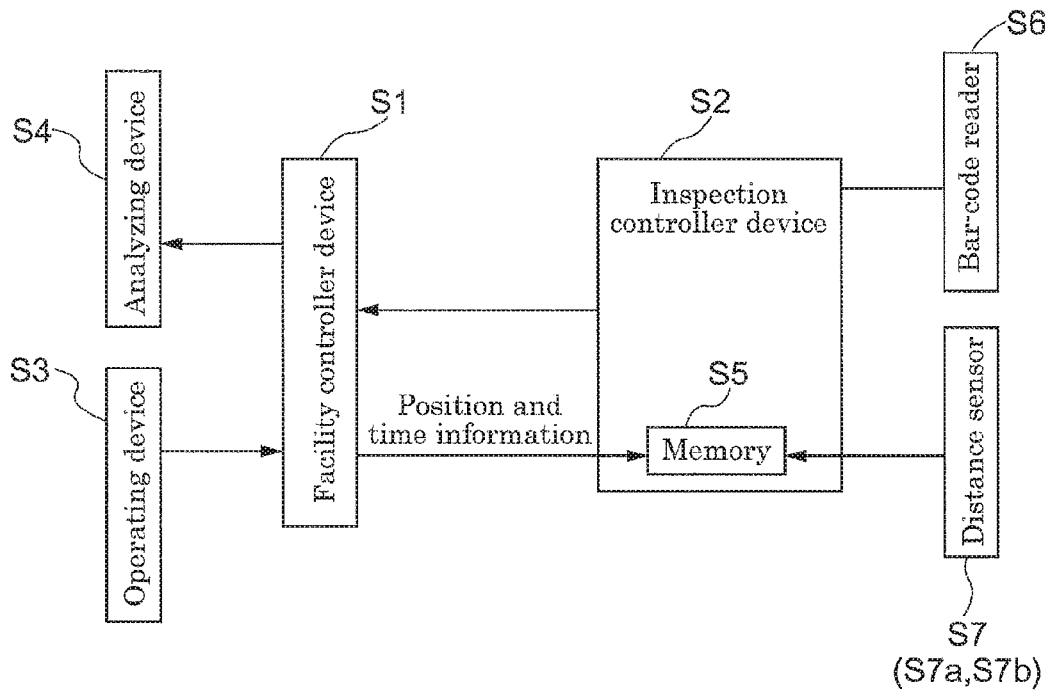
FIG. 6 is a block diagram of various sensors and controllers.

In the present embodiment, the inspection controller device S2 is supported within the inspection vehicle main body 10 and by a support plate 10a. That is, the inspection controller device S2 is provided to the inspection vehicle 3a in the present embodiment. Note that, as shown in FIG. 6, provided separately from the inspection controller device S2 is a facility controller device S1 (an example of a travel controller) which performs tasks such as, among other things, issuing operation instructions to the travel vehicles 3 of the article transport facility. The inspection controller device S2 is configured to be capable of communicating with the facility controller device S1 through a communication controller (not shown) provided within the inspection vehicle main body 10. Incidentally, in the present embodiment, an operating device S3 is electrically connected to the facility controller device S1 wirelessly or through wires. And a worker specifies the inspection route by means of the operating device S3 to have an inspection performed by the inspection vehicle 3a.

The distance between each pair of the distance sensors S7a, S7b along the travel direction is set to be greater than or equal to 20 mm and less than or equal to 45 mm. And, as shown in FIGS. 2 and 3, two pairs (right hand side pair and the left hand side pair) of distance sensors S7a, S7b are provided with each pair supported by a bracket extending from the actuator 20 to the corresponding side along the vehicle body lateral direction of the first travel portion 9f. As shown in FIG. 5, each pair of distance sensors S7a, S7b are so positioned that, when the first travel portion 9f is traveling along the straight portion 1a of a travel path 1, the pair of sensors S7a, S7b overlap with the travel surface of the corresponding travel rail 2 in plan view except in the portion in which the travel rail 2 does not exist in a curved portion of the travel path 1. That is, one pair of distance sensors S7a, S7b is provided for each rail 2 of the pair of travel rails 2.

More specifically, a first pair of distance sensors S7a, S7b (first distance sensor pair), and a second pair of distance sensors S7a, S7b (second distance sensor pair) are provided separately as pairs of distance sensors S7a, S7b and are so located that the first pair of distance sensors S7a, S7b measures the distance to the travel surface of one rail 2 (first travel rail) of the pair of travel rails 2 whereas the second pair of distance sensors S7a, S7b measures the distance to the travel surface of the other rail 2 (second travel rail) of the pair of travel rails 2.

Note that, in order to reduce the effect on the measurements due to the vibration caused by the travel wheels 15 (first travel wheels 150 of the first travel portion 9f traveling through and over a step etc., each pair of distance sensors S7a, S7b is located forward, along the travel direction, of the corresponding travel wheel 15 of the first travel portion 9f.

In addition, in the present embodiment, each pair of distance sensors S7a, S7b is connected to a sensor amplifier, which has a function of deriving and outputting the difference between the measured values obtained by these sensors S7a, S7b.

By adopting such arrangement, it becomes possible to obtain the difference between the measured values obtained by the pair of distance sensors S7a, S7b for each rail 2 of the travel rails 2. The difference (more specifically, the absolute value of the difference) is a value that correlates with the distance to the travel surface of the corresponding travel rail 2. For example, the absolute value of the difference is zero, when a step, etc., is not formed in the travel surface of the travel rail 2 whereas, when a step is formed, the value that corresponds to the depth of the step will be outputted as the absolute value of the difference.

Accordingly, the inspection controller device S2 stores the absolute value of the aforementioned difference in the memory S5 as a value that correlates with the distance to the travel surface of the corresponding travel rail 2. In other words, the inspection controller device S2 uses the difference between the measured values obtained by a given pair of distance sensors S7a and S7b, as an indicator for managing the distance to the travel surface of the travel rail 2. As a result, for example, it becomes possible to properly maintain the travel rails 2 using the distance to the travel surface managed by the inspection controller device S2.

Note that on the underside of a travel rail 2, a bar code B which includes position information along the travel path 1 is provided at each specific distance or interval along the path longitudinal direction. And a bar-code reader S6 for reading the bar codes B is provided to the inspection vehicle 3a at an upper location of the inspection vehicle main body 10. The position information read by the bar-code reader S6 as well as time information related to the time of the reading is transmitted to the facility controller device S1 through the communication controller (not shown), which information is stored by the facility controller device S1.

The inspection controller device S2 obtains, from the facility controller device S1, the position information about each position at which the difference stored in the memory S5 was obtained and time information about each time when the difference was obtained, and stores in the memory S5 the position information and time information such that the position information and the time information is linked with the corresponding difference.

When the travel for the inspection is completed, or at each predetermined time interval from the start of the inspection, the inspection vehicle 3a moves to near the facility controller device S1 to transmit the data stored in the memory S5 of the inspection controller device S2 to an analyzing device S4 (an example of an inspection controller) through the facility controller device S1, with a worker manually connecting the inspection controller device S2 to the facility controller device S1 with a wire.

The analyzing device S4, determines a presence of a step D in the travel surfaces of the travel rails 2 (which is an example of managing of the distance to the travel surfaces of the travel rails 2) based on the difference between the measured values obtained by each pair of distance sensors S7a and S7b. More specifically, the analyzing device S4 identifies a difference between the measured values obtained by a pair of distance sensors S7a, S7b to be the depth (Δx in FIG. 7) of a step D, and determines that there is a repair target step if and when the difference is greater than or equal to a step determining threshold (for example, 5 mm), which is an example of the managing of the distance to the travel surface of the travel rail 2. Note that the distance to the travel surface of the travel rail 2 may, for example, be the distance between the distance sensors S7 and the corresponding travel surface or may be the distance between the travel portion 9 (first travel portion 9f) and the travel surface.

The analyzing device S4 has, for example, a display for displaying the location, along a travel path 1, of a repair target step, as well as display software so that the analyzing device S4 has a function to cause a worker to visually recognize the location, along the travel path 1, of a repair target step.

Note that the facility controller device S1 issues instructions, on the upper speed limit for each section specified by the bar code B along a travel path 1, to both of the inspection vehicle 3a and the article transport vehicles 3b in advance. And both the inspection vehicle 3a and the article transport vehicles 3b have respective upper speed limits stored in their memory so that both the inspection vehicle 3a and the article transport vehicle 3b travel based on that information. And in the present embodiment, the facility controller device S1 sets the upper speed limit for the inspection vehicle 3a and the upper speed limit for the article transport vehicle 3b to be equal in any given section of a travel path 1. With such arrangement, the inspection can be conducted smoothly by the inspection vehicle 3a without reducing the travel speed of the inspection vehicle 3a so that congestion of the article transport vehicles 3b can be prevented; thus, transporting of articles by the article transport vehicles 3b can be performed smoothly.

Alternative Embodiments (1) In the embodiment described above, an example is described in which the inspection vehicle 3a and the article transport vehicles 3b travel on the travel rails 2 simultaneously.

However, the invention is not limited to the situation in which the inspection vehicle 3a and the article transport vehicles 3b travel on the travel rails 2 simultaneously, and encompasses a situation in which only the inspection vehicle 3a travels on the travel rails 2. In addition, in the embodiment described above, an example is described in which a single inspection vehicle 3a travels; however, arrangements may be made so that two or more inspection vehicles 3a travel simultaneously.

(2) In the embodiment described above, an example is described in which the inspection vehicle 3a and the article transport vehicles 3b as the travel vehicles 3 are ceiling or overhead travel vehicles. However, both of these vehicles may be travel vehicles that travel along the travel rails 2 installed on the ground.

(3) In the embodiment described above, an example of arrangement is described in which each pair of distance sensors S7a, S7b is located forward, along the travel direction, of the corresponding first travel wheel 15f of the first travel portion 9f.

However, the arrangement may be adopted in which each pair of distance sensors S7a, S7b is located rearward, along the travel direction, of the corresponding first travel wheel 15f of the first travel portion 9f.

(4) In the embodiment described above, an example is described in which the inspection controller device S2 is mounted in the inspection vehicle main body 10 of the inspection vehicle 3a.

However, the inspection controller device S2 may be installed on the ground. In this case, an arrangement may be adopted in which the communication controller of the inspection vehicle main body 10 transmits the difference between the measured values obtained by the pair of distance sensors S7a, S7b right after each measurement to the analyzing device S4 through the inspection controller device S2.

(5) In the embodiment described above, an example is described in which the sensor amplifier to which each pair of distance sensors S7a, S7b is connected has a function of deriving, or calculating, the difference between the measured values obtained by the sensors S7a, S7b.

However, an arrangement may be made in which the inspection controller device S2 has the function of deriving, or calculating, the difference between the measured values obtained by the sensors S7a, S7b.

(6) In the embodiment described above, an example is described in which the facility controller device S1 sets the upper speed limit of the inspection vehicle 3a and the upper speed limit of the article transport vehicle 3b to be equal to each other.

However, the upper speed limit of the inspection vehicle 3a may be different from the upper speed limit of the article transport vehicle 3b.

(7) In the embodiment described above, the concept of the analyzing device S4 is described to be included in the concept of the inspection controller. However, an arrangement in which the analyzing device S4 is not included in the inspection controller also falls within the scope of the present invention.

In other words, an article transport facility which does not include the analyzing device S4 also falls within the scope of the present invention, in which case, it is preferable to provide an analyzing device separately from the article transport facility.

Note that an arrangement disclosed in one of the embodiments described above (which include the alternative embodiments (same is true for all embodiments mentioned below)) may be used in combination with an arrangement disclosed in another of the embodiments unless such combination leads to an inconsistency. In addition, the embodiments disclosed in the present description are for illustration purposes only. And the embodiments of the present invention are not limited to these embodiments described above and may be modified as necessary without falling outside the purposes and scope of the present invention.

Summary of Embodiments Described Above

A brief summary of the article transport facility described above is provided next.

The article transport facility comprises:

a travel rail installed along a travel path; a travel vehicle which is guided along the travel path with a travel wheel rolling on a travel surface of the travel rail;

wherein the travel vehicle has a distance measuring device for measuring a distance to the travel surface, and wherein the distance measuring device includes a pair of distance sensors spaced apart from each other along a travel direction of the travel vehicle.

In the article transport facility having the features described above, the distance measuring device provided to the travel vehicle includes a pair of distance sensors spaced apart from each other along the travel direction of the travel vehicle. The difference (or the absolute value thereof) between the measured values obtained by the pair of distance sensors spaced apart from each other along the travel direction is a value that does not include the effect of any vibrations that may occur with the traveling of the travel vehicle. And when the pair of distance sensors measure a location in which no step is formed in the travel surface of the travel rail, the difference is zero, whereas when the pair of distance sensors measure a location in which a step is formed, the difference takes on a value greater than zero. As a result, a step which may be formed in the travel surface, for example, can be properly detected without being affected by any vibrations that may occur with the traveling of the travel vehicle.

Here, an inspection controller is preferably provided which determines a presence of a step in the travel surface of the travel rail based on a difference between measured values obtained by the pair of distance sensors.

The difference between the measured values obtained by the pair of distance sensors spaced apart from each other along the travel direction is a value with the effect of any vibration (that may occur with the traveling of the travel vehicle) removed and is outputted as a value whose absolute value is greater when the pair of distance sensors measure a location in which a step is formed in a form of as a discontinuity, etc., in the travel surface of the travel rail, for example.

Therefore, by determining the presence of a step in the travel surface of the travel rail based on the difference, the presence of a step in the travel surface of the travel rail can be determined properly even when the travel vehicle vibrates, etc.

In addition, the inspection controller preferably obtains the difference between the measured values obtained by the pair of distance sensors as a depth of the step, and determines that there is a repair target step, as the step, when the difference is greater than or equal to a step determining threshold.

A step formed in the travel surface of a travel rail in an article transport facility may be a repair target step which is a step whose depth is greater than or equal to 5 mm and which needs to be repaired immediately, or may be a step whose depth is less than 5 mm and which does not need to be repaired immediately.

The difference between the measured values obtained by the pair of distance sensor is used as an indicator for determining a step in the article transport facility of the present application. And this difference is a value that corresponds to the depth of a step.

Thus, with the arrangement described above, by adopting the arrangement in which a step is determined to be a repair target step when the measured difference is greater than the step determining threshold (for example, 5 mm) which is decided in advance and stored in a memory, a deep step which needs to be repaired immediately in particular can be properly distinguished from a shallower step which does not need to be repaired immediately, among the locations in which the difference has been measured.

Thus, by arranging the inspection controller to output, for example, a control command to the display etc., such as instructions to give priority to the repair target steps when repairing the steps, a worker can repair the steps that need to be repaired, as repairing targets; thus, maintenance work can be performed with improved efficiency.

In addition, a guide rail is preferably provided separately from the travel rail, wherein the travel path includes a straight portion which extends straight and a curved portion which is curved, wherein, in the curved portion, the guide rail is preferably so arranged and located to extend along the curved portion, wherein the travel vehicle preferably includes a guide auxiliary wheel which is guided by the guide rail in the curved portion of the travel path, and wherein the guide auxiliary wheel preferably sets an attitude, as seen along the travel direction, of the travel vehicle traveling along the curved portion.

In an ordinary article transport facility, when a travel vehicle travels along a curved portion of a travel path, one or more guide auxiliary wheels, that are provided to the travel vehicle and guided by a guide rail, set the attitude, as seen along the travel direction, of the travel vehicle traveling along the curved portion such that the travel vehicle is caused to assume a tilted attitude which is tilted, as seen along the travel direction, relative to the normal travelling attitude assumed by the travel vehicle as it travels along a straight portion of the travel path. Here, the tilted attitude is an attitude in which the travel vehicle is tilted, as seen along the travel direction, inward of the curved portion (the direction opposite from the direction of the centrifugal force), taking into consideration the centrifugal force on the travel vehicle as it travels along the curved portion of the travel path.

In this tilted attitude, the distance between the pair of distance sensors and the travel surface of the travel rail changes from the distance in the normal travelling attitude. With the arrangement described above, the difference between the measured values obtained by the pair of distance sensors spaced apart from each other along the travel direction of the travel vehicle can be a value with the effect of the tilting removed even in such a tilted attitude; thus, the managing (determination of the presence of a step) of the distance to the travel surface of the travel rail can be properly performed.

Note that, in the present description, the travel direction is defined to be a direction perpendicular to the direction along which the axis of rotation of the travel wheel extends, in plan view.

In addition, the pair of distance sensors are preferably located forward, along the travel direction, of the travel wheel of the travel vehicle.

By locating the pair of distance sensors forward, along the travel direction, of the travel wheel of the travel vehicle, because the pair of distance sensors can make measurements and detect a step which often occurs at a joint, before the travel wheel passes over a joint, etc., in the travel rail, for example, and vibrates, the determination of the presence of a step can be performed accurately based on the measurements.

In addition, a first travel rail as the travel rail and a second travel rail are preferably provided along the travel path, wherein the distance measuring device includes a first distance sensor pair which is the pair of distance sensors, and a second distance sensor pair which is a different pair of distance sensors, wherein the first distance sensor pair is preferably located to measure the distance to the travel surface of the first travel rail and wherein the second distance sensor pair is preferably located to measure the distance to a travel surface of the second travel rail.

A pair of travel rails are usually installed along the travel direction in an article transport facility. And the step described up to this point can be a step that exists in one or the other rail of the pair of the travel rails and thus is a target of measurements. With the arrangement described above, any step that may exist in one or the other rail of the pair of travel rails is also a target of measurements. Accordingly, the presence of any step in either or both of the pair of travel rails can be properly determined.

In addition, the travel controller is preferably provided which controls travel of the travel vehicle along the travel path, wherein the travel vehicle preferably has an inspection controller which includes a memory for storing measured values obtained by the pair of distance sensors, wherein the inspection controller preferably obtains from the travel controller position information which is information related to a position, along the travel path, of the travel vehicle, and stores in the memory the position information and a difference between measured values obtained by the pair of distance sensors at a position corresponding to the position information such that the position information is linked to the difference.

With the arrangement described above, because the difference between the measured values obtained by the pair of distance sensors and the position along the travel path are stored such that the distance and the position are put in correspondence with each other, information on the position at which a step is formed along the travel path and information on the position at which a defect can develop into a step in the future can be readily outputted. Thus ability to perform maintenance efficiently can be improved.

In addition, an article transport vehicle for transporting an article to be transported is preferably provided in addition to an inspection vehicle which is the travel vehicle which inspects the travel rail, and wherein a travel controller is preferably provided which controls an upper limit for a travel speed of the inspection vehicle and an upper limit for a travel speed of the article transport vehicle to have a same value.

When article transport vehicles for transporting articles to be transported and an inspection vehicle with a pair of distance sensors to inspect a travel rail are provided separately, the travel speed of the inspection vehicle is usually set to be less than the travel speed of the article transport vehicles to improve accuracy of the inspection. In such a case, a traffic congestion may occur along the travel rail with the lower-speed inspection vehicle at the front, causing delay in transporting of articles by the article transport vehicles.

In contrast, the inspection vehicle of an article transport facility of the present application has a pair of distance sensors spaced apart from each other along the travel direction. And the difference between the measured values obtained by the pair of distance sensors is used as an indicator for the inspection. Therefore, even when the travel speed is increased, the managing (for example, determination of the presence of a step in the travel surface) of the distance to the travel surface of the travel rail can be performed properly with the effect of vibration etc. properly removed.

Thus, with the arrangement described above, and with the travel controller controlling the upper limit for the travel speed of the inspection vehicle and the upper limit for the travel speed of the article transport vehicle to have the same value, an article transport facility can be provided in which articles can be transported efficiently without the inspection vehicle interfering with the transporting of an article by the article transport vehicle, while properly performing the managing (determination of the presence of a step in the travel surface) of the distance to the travel surface of the travel rail.

What is claimed is:

1. An article transport facility comprising:
    a travel rail installed along a travel path;
    a travel vehicle which is guided along the travel path with a travel wheel rolling on a travel surface of the travel rail;
    wherein the travel vehicle has a distance measuring device for measuring a distance to the travel surface, and
    wherein the distance measuring device includes a pair of distance sensors spaced apart from each other along a travel direction of the travel vehicle, and
    wherein one of the pair of distance sensors measures a distance to a first position on the travel surface, and the other of the pair of distance sensors measures a distance to a second position which is apart in the travel direction from the first position on the travel surface.

2. The article transport facility as defined in claim 1, wherein
    an inspection controller is provided which determines a presence of a step in the travel surface of the travel rail based on a difference between measured values obtained by the pair of distance sensors.

3. The article transport facility as defined in claim 2, wherein
    the inspection controller obtains the difference between the measured values obtained by the pair of distance sensors as a depth of the step, and determines that there is a repair requiring step, as the step, when the difference is greater than or equal to a step determining threshold.

4. The article transport facility as defined in claim 1, wherein
    a guide rail is provided separately from the travel rail,
    wherein the travel path includes a straight portion which extends straight and a curved portion which is curved,
    wherein, in the curved portion, the guide rail is so arranged and located to extend along the curved portion,
    wherein the travel vehicle includes a guide auxiliary wheel which is guided by the guide rail in the curved portion of the travel path, and
    wherein the guide auxiliary wheel sets an attitude, as seen along the travel direction, of the travel vehicle traveling along the curved portion.

5. The article transport facility as defined in claim 1, wherein
    the pair of distance sensors are located forward, along the travel direction, of the travel wheel of the travel vehicle.

6. The article transport facility as defined in claim 1, wherein
    a first travel rail as the travel rail and a second travel rail are provided along the travel path,
    wherein the distance measuring device includes a first distance sensor pair which is the pair of distance sensors, and a second distance sensor pair which is a different pair of distance sensors, and wherein the first distance sensor pair is located to measure the distance to the travel surface of the first travel rail and wherein the second distance sensor pair is located to measure the distance to a travel surface of the second travel rail.

7. The article transport facility as defined in claim 1, wherein a travel controller is provided which controls travel of the travel vehicle along the travel path, wherein the travel vehicle has an inspection controller which includes a memory for storing measured values obtained by the pair of distance sensors, wherein the inspection controller obtains from the travel controller position information which is information related to a position, along the travel path, of the travel vehicle, and stores in the memory the position information and a difference between measured values obtained by the pair of distance sensors at a position corresponding to the position information such that the position information is linked to the difference.

8. The article transport facility as defined in claim 1, wherein an article transport vehicle for transporting an article to be transported is provided in addition to an inspection vehicle which is the travel vehicle which inspects the travel rail, and wherein a travel controller is provided which controls an upper limit for a travel speed of the inspection vehicle and an upper limit for a travel speed of the article transport vehicle to have a same value.

* * * * *